（12) United States Patent
Brinkman et al.

(10) Patent No.: US 9,822,297 B2
(45) Date of Patent: Nov. 21, 2017

(54) INVERTIBLE WATER-IN-OIL LATICES AND METHODS OF USE

(71) Applicant: Ecolab USA Inc., St. Paul, MN (US)

(72) Inventors: Kerry C. Brinkman, Naperville, IL (US); Emily C. Hart, Downers Grove, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/152,833

(22) Filed: May 12, 2016

(65) Prior Publication Data

US 2016/0333252 A1    Nov. 17, 2016

Related U.S. Application Data

(60) Provisional application No. 62/160,693, filed on May 13, 2015, provisional application No. 62/200,744, filed on Aug. 4, 2015.

(51) Int. Cl.
| | | |
|---|---|---|
| C08J 3/00 | (2006.01) | |
| C09K 8/588 | (2006.01) | |
| C09K 8/584 | (2006.01) | |
| C09D 133/26 | (2006.01) | |

(52) U.S. Cl.
CPC ............ *C09K 8/588* (2013.01); *C09D 133/26* (2013.01); *C09K 8/584* (2013.01)

(58) Field of Classification Search
CPC ....... C09K 8/588; C09K 8/584; C09D 133/26
See application file for complete search history.

(56) References Cited

U.S. PATENT DOCUMENTS

| | | | | |
|---|---|---|---|---|
| 3,724,547 A | * | 4/1973 | Bott | ........................ C09K 8/607 166/270.1 |
| 3,997,492 A | | 12/1976 | Kane et al. | |
| 4,432,881 A | | 2/1984 | Evani | |
| 5,067,508 A | * | 11/1991 | Lee | ........................ F17D 1/17 137/13 |
| 5,124,376 A | * | 6/1992 | Clark, Jr. | ................... C08J 3/03 523/336 |
| 5,530,069 A | | 6/1996 | Neff et al. | |
| 7,785,442 B2 | | 8/2010 | Jacobson et al. | |
| 8,512,684 B2 | | 8/2013 | Mallo et al. | |
| 2010/0029880 A1 | * | 2/2010 | Zhang | ..................... C09K 8/584 526/287 |
| 2010/0233108 A1 | * | 9/2010 | Mallo | .................. A61K 8/8158 424/59 |
| 2014/0051620 A1 | | 2/2014 | Soane et al. | |
| 2016/0333253 A1 | * | 11/2016 | Logan | .................... C09K 8/588 |
| 2017/0037299 A1 | * | 2/2017 | Li | ........................... C09K 8/588 |
| 2017/0037300 A1 | * | 2/2017 | Li | ........................... C09K 8/588 |

FOREIGN PATENT DOCUMENTS

| | | |
|---|---|---|
| WO | 03/033553 A1 | 4/2003 |
| WO | 2005/058977 A1 | 6/2005 |

OTHER PUBLICATIONS

International Search Report for International Application No. PCT/US2016/032042, dated Aug. 24, 2016, 7 pages.
Written Opinion for International Application No. PCT/US2016/032042, dated Aug. 24, 2016, 6 pages.

* cited by examiner

*Primary Examiner* — Hannah Pak

(74) *Attorney, Agent, or Firm* — Kagan Binder, PLLC

(57) ABSTRACT

Invertible latices suitable for use in enhanced oil recovery are formed by adding a first inversion surfactant and a second inversion surfactant to a water-in-oil latex comprising about 15 wt % to 50 wt % of a water soluble polymer having a net ionic charge. The first inversion surfactant has a hydrophilic/lipophilic balance of about 15 to 35 and an ionic charge that is the opposite of the net ionic charge of the polymer. The second inversion surfactant has a hydrophilic/lipophilic balance of between about 8 and 20. The invertible latices are diluted in a single step to provide dilute latices having 10,000 ppm or less polymer solids.

2 Claims, No Drawings

INVERTIBLE WATER-IN-OIL LATICES AND METHODS OF USE

TECHNICAL FIELD

The invention relates to water-in-oil latices of water dispersible polymers suitable for single step dilution to 10,000 ppm polymer or less using water sources having high temperature, high total dissolved solids, or both.

BACKGROUND

Crude oil development and production can include up to three distinct phases: primary, secondary, and tertiary (or enhanced) recovery. During primary recovery, the natural pressure of the reservoir or gravity drives oil into the wellbore, combined with artificial lift techniques (such as pumps) which bring the oil to the surface. But only about 10 percent of a reservoir's original oil in place is typically produced during primary recovery. Secondary recovery techniques extend a field's productive life generally by injecting water or gas to displace oil and drive it to a production wellbore, resulting in the recovery of 20 to 40 percent of the original oil in place.

Enhanced oil recovery, or EOR, is a generic term encompassing techniques for increasing the amount of crude oil that can be extracted from a subterranean formation such as an oil field. EOR techniques offer prospects for ultimately producing 30 to 60 percent, or more, of the reservoir's original oil in place. Three major categories of EOR have been found to be commercially successful to varying degrees:

Thermal recovery—the introduction of heat such as the injection of steam to lower the viscosity of the oil, and improve its ability to flow through the reservoir.

Gas injection—injection of gases such as natural gas, nitrogen, or carbon dioxide that expand in a reservoir to push additional oil to a production wellbore, or gases that dissolve in the oil to lower its viscosity and improve flow rate.

Chemical injection—injection of polymer dispersions to increase the effectiveness of waterfloods, or the use of detergent-like surfactants to help lower the surface tension that often prevents oil droplets from moving through a reservoir. Chemical injection of a polymer is also referred to as polymer flooding. This method improves the vertical and areal sweep efficiency as a consequence of improving the water/oil mobility ratio. In addition, the polymer reduces the contrasts in permeability by preferentially plugging the high permeability zones flooded. This forces the water to flood the lower permeability zones and increases the sweep efficiency. The art in this area is well-developed for conventional oil recovery applications.

Of these techniques, polymer flooding is particularly favored. Polymer flooding is generally accomplished by dissolving the selected polymer in water, and injecting the polymer solution into the reservoir. However, since the target concentration of polymer in the polymer dispersions is typically about 1 wt % or less, transport at the target concentration is not economically efficient. Transporting dry polymers, while economically efficient for the supplier, is not favorable for field use due to difficulties in fully hydrating the polymers in the field, especially off-shore fields. To address these issues, latex polymers are particularly favored for use in offshore reservoirs and other relatively isolated operations due to the ease of use and relatively simple equipment requirements. Various formulations have been developed to allow economically feasible transportation and storage. Specialized methods have also been developed to convert the formulations to use concentrations of fully hydrated polymers in the field.

Organic polymers traditionally used in EOR include water soluble polymers such as polyacrylamides, polyacrylates, and hydrophobically modified water soluble polymers, also called associative polymers or associative thickeners. Associative thickeners are typically copolymers of acrylamide, acrylic acid, or both with about 1 mole % or less of a hydrophobic monomer such as a $C_8$-$C_{16}$ linear or branched ester of acrylic acid. Such polymers are deliverable as powder, as a concentrate such as a 20 wt % polyacrylamide gel, or in the water phase of a water-in-oil (w/o) latex. Of these formats, water-in-oil latices have the advantage of being deliverable in a liquid format that is easily handled in the field because the latex viscosity is lower than that of a water solution of comparable wt % polymer.

Commercial w/o latices are formulated for EOR by dissolving monomer in a high-solids aqueous solution to form a water phase, mixing a hydrocarbon solvent and a nonionic surfactant having a hydrophilic-lipophilic balance (HLB) of about 2 to 8 to form an oil phase, mixing the two phases using techniques to result in a water-in-oil emulsion or latex, and polymerizing the monomer via a standard thermal free-radical or redox initiation. After polymerization is complete, a higher HLB surfactant (HLB>8) is often added as a destabilizer to facilitate latex inversion when water is added. "Inversion" is a term of art to describe the dilution of w/o latices with a water source, causing destabilization of the latex and subsequent dissolution of the concentrated polymer particles. In some cases, the higher HLB surfactant is added in the field, immediately prior to addition of water to dilute the latex; or is added in-line with the water source used to dilute the latex. In other cases, the higher HLB surfactant is added directly to the w/o latex after polymerization is complete, and the latex is stable or even shelf stable. In such cases, careful control of type and amount of surfactant is required to provide a sufficiently stable latex to facilitate storage and transportation, while providing for improved inversion performance in the field.

Recently, there has arisen the need to address polymer flooding in challenging conditions encountered in reservoirs wherein the ambient or produced water contacted by the polymer includes high total dissolved solids, such as a high saline or hardness content, in some cases involving total dissolved solids of up to about 30 wt %. In some cases the ambient or produced water is tap water, hard water, brackish water, municipal waste water, produced water, or seawater. Field operators strongly prefer to use such water sources to dilute polymer flooding formulations to final use concentrations rather than employ purified water sources. However, use of such water sources lead to difficulties in dispersing the high molecular weight polymers to use concentrations. Inversion of w/o latices in such water sources can result in slow inversion times and/or requirement of multistage dilution and mixing procedures; it can also result in coagulation, precipitation, or gross phase separation of polymer upon or after contact of the latex with the diluted water environment. Thus there is a need to address inversion of w/o latices in field conditions where the use water source has high total dissolved solids.

Another need in the industry is to address reservoirs where the water source contacted by a w/o latex is at an elevated temperature, such as 60° C. to 100° C. High temperature water sources lead to difficulties in dispersing high molecular weight, water soluble polymers delivered in w/o latices, similarly to the difficulties encountered in the use of high total solids water sources. In some cases, conditions of both elevated temperature and high total dissolved solids are encountered in the ambient or produced water source employed to dilute polymer flooding formulations to use concentrations. Such conditions cause instability of w/o latices during inversion, evidenced by formation of gel particles, coagulum, polymer coated out on contact surfaces, and gross coalescence of phases (conventionally referred to as "separation") and the like. The products of this instability cause plugged equipment in the field and failure to accomplish mobility control within the reservoir. These problems remain largely unaddressed by conventional formulations, methods and equipment developed for inversion of w/o latices in the field.

For a conventional w/o latex inversion employing conventional inversion methodology, particularly having high total dissolved solids water sources, the efficiency of polymer release from the w/o latex can be dependent upon the initial concentration at which the latex is mixed with water. There exists a concentration effect that allows for much more efficient inversion when the initial polymer concentration is greater than about 5,000 ppm and especially greater than about 10,000 ppm (1 wt %). This corresponds to mixing several percent of latex solids into the water, depending upon the polymer concentration in the latex product. To take advantage of this effect, two-stage inversion systems are often employed to produce an initially high-concentration "mother solution" which is subsequently diluted to the targeted concentration after inversion is complete. This two-stage inversion process, while effective when employing water sources at high temperature and/or high total dissolved solids, requires more equipment and interim storage space for the mother solution. However, for conventional w/o latices that are diluted employing conventional methodology, direct dilution to a target polymer concentration of about 100 to 10,000 ppm will result in only partial release of the polymer particles and subsequent low viscosity, solution instabilities, and poor economics.

As a result, there is a substantial need in the industry to develop technologies suitable for carrying out enhanced oil recovery in reservoirs where high temperature water sources, high total dissolved solids water sources, or both are used in conjunction with EOR. There is a substantial need in the industry for w/o polymer latices that invert rapidly to form stable, fully hydrated or dissolved polymer solutions at water temperatures of 60° C. to 100° C. There is a substantial need in the industry for w/o polymer latices that invert rapidly to form stable, fully hydrated or dissolved polymer solutions using water sources having up to 30 wt % total dissolved solids. There is a substantial need in the industry for w/o polymer latices that invert rapidly to form stable, fully hydrated or dissolved polymer solutions at polymer concentrations of about 0.01 wt % to 1 wt % using water sources having high total dissolved solids, high temperature, or both.

SUMMARY

Described herein are invertible latices. The invertible latices are formed by adding a combination of at least two surfactants to a water-in-oil (w/o) latex comprising about 15 wt % to 50 wt % of a water soluble polymer having at least about 50 mole % acrylamide content. In embodiments, the inversion surfactants added to the w/o latex include about 0.1 wt % to 2.0 wt % based on latex weight of a first inversion surfactant having a hydrophilic/lipophilic balance of about 15 to 35; and about 0.2 wt % to 4.0 wt % based on latex weight of a second inversion surfactant having a hydrophilic/lipophilic balance of between about 8 and 20. In some embodiments, the w/o latex comprises about 15 wt % to 50 wt % of the water soluble polymer, about 10 wt % to 50 wt % water, about 15 wt % to 30 wt % of a compound or blend thereof that is less than 0.1 wt % soluble in water at 25° C. and is substantially a liquid over the range of 20° C. to 100° C. and comprising linear, branched, or cyclic hydrocarbon moieties, and about 5 wt % or less of latex emulsifying surfactants characterized as a nonionic surfactant having a hydrophilic/lipophilic balance of between 2 and 10.

Also described herein is a method of forming an invertible latex, the method comprising a) forming a water-in-oil latex comprising about 15 wt % to 50 wt % of a water soluble polymer having at least about 50 mole % acrylamide content, about 10 wt % to 50 wt % water, about 15 wt % to 30 wt % of a compound or blend thereof that is less than 0.1 wt % soluble in water at 25° C. and is substantially a liquid over the range of 20° C. to 100° C. and comprising linear, branched, or cyclic hydrocarbon moieties; and about 5 wt % or less of latex emulsifying surfactants characterized as having a combined hydrophilic/lipophilic balance of between 2 and 10, b) adding to the latex about 0.1 wt % to 2.0 wt % based on total latex weight of a first inversion surfactant having an HLB of about 15 to 35, to form an intermediate latex; and c) adding to the intermediate latex about 0.2 wt % to 4.0 wt % of a second inversion surfactant having an HLB of between about 8 and 20 to form an invertible latex.

Also described herein is a method of recovering hydrocarbon compounds from a subterranean reservoir, the method comprising a) forming an invertible latex comprising about 15 wt % to 50 wt % of a water soluble polymer having at least about 50 mole % acrylamide content, about 10 wt % to 50 wt % water, about 15 wt % to 30 wt % of a compound or blend thereof that is less than 0.1 wt % soluble in water at 25° C. and is substantially a liquid over the range of 20° C. to 100° C. and comprising linear, branched, or cyclic hydrocarbon moieties, about 5 wt % or less of latex emulsifying surfactants characterized as a nonionic surfactant having a hydrophilic/lipophilic balance of between 2 and 10, about 0.1 wt % to 2.0 wt % of a first inversion surfactant having a hydrophilic/lipophilic balance of about 15 to 35; and about 0.2 wt % to 4.0 wt % of a second inversion surfactant having a hydrophilic/lipophilic balance of between about 8 and 20; b) adding a water source to the invertible latex in a single addition to form a polymer flooding solution comprising about 100 ppm to 10,000 ppm of the water soluble polymer, c) injecting the polymer flooding solution into the subterranean reservoir, and d) recovering the hydrocarbon compounds.

Also described herein is a method of recovering hydrocarbon compounds from a subterranean reservoir, the method comprising a) forming a water-in-oil latex, b) adding to the latex about 0.1 wt % to 2.0 wt % based on total latex weight of a first inversion surfactant having an HLB of about 15 to 35 to form an intermediate latex; c) adding to the intermediate latex about 0.2 wt % to 4.0 wt % of a second inversion surfactant having an HLB of between about 8 and 20 to form an invertible latex; d) adding a water source to the invertible latex in a single addition to form a polymer flooding solution comprising about 100 ppm to 10,000 ppm of the water soluble polymer, e) injecting the polymer flooding solution into the subterranean reservoir, and f) recovering the hydrocarbon compounds.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

As used herein, the term "polymer" means a water soluble or water dispersible polymer having at least 50 mole % acrylamide content (that is, the polymerized residue of acrylamide; or acrylamide repeat units). The term "polymer" encompasses and includes homopolymers, copolymers, terpolymers and polymers with more than 3 monomers, crosslinked or partially crosslinked polymers, and combinations or blends of these.

The term "monomer" is used in context to mean either an unsaturated compound or the polymerized residue thereof. As used herein, the term "anionic monomer" means an unsaturated compound or polymerized residue thereof bearing an acidic group having a pKa of about 5 or less, or a salt thereof. As used herein, the term "cationic monomer" means an unsaturated compound or polymerized residue thereof bearing a positive charge, or a salt thereof.

As used herein, the term "water source" means a source of water comprising, consisting essentially of, or consisting of fresh water, deionized water, distilled water, produced water, municipal water, waste water such as runoff water or municipal waste water, treated or partially treated waste water, well water, brackish water, "gray water", sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof. In some embodiments, a water source includes about 0 wt % to 30 wt % total dissolved solids. The term "waterbased" or "water solution" generally refer to a composition including a water source listed herein. Generally and as determined by context, the term "water source" includes high total dissolved solids water sources, high temperature water sources, and water sources that are both high total dissolved solids and high temperature water sources.

As used herein, the term "high temperature" means about 60° C. to 100° C., as specified or determined by context.

As used herein, the term "high total dissolved solids" refers to a water source having at least 0.5 wt % non-polymeric solids dissolved therein, and in embodiments up to about 30 wt % non-polymeric solids dissolved therein. In general, "saline" or "salinity" refers to a water source wherein a portion, in some embodiments a substantial portion, the total dissolved solids are salts, as determined by context.

As used herein, the terms "water-in-oil latex" or "w/o latex" mean a discontinuous internal water phase within a continuous oil phase, wherein the water phase includes at least one monomer or polymer. A "water-in-oil latex" is also commonly known as an inverse emulsion polymer. In general and as determined by context, these terms denote a latex prior to addition of inverting surfactants.

As used herein, the term "oil" or "hydrocarbon solvent" as applied to an oil phase of a water-in-oil latex, means any compound or blend thereof that is less than 0.1 wt % soluble in water at 25° C., is substantially chemically inert within a w/o latex as described herein, and is a liquid over at least the range of 20° C. to 100° C.

As used herein, the term "water phase" means a water source having at least a monomer or polymer dispersed or dissolved therein, further wherein the dispersion or solution is a discontinuous phase within a w/o latex.

As used herein, the term "stable" as applied to a latex or emulsion means a kinetically stable latex that absent any force applied, temperature change, or chemical added to a latex, the latex is or is capable of being substantially free of coagulation, plating out, precipitation, gross coalescence of phases (conventionally referred to as "separation") or any other evidence of instability conventionally associated with water-in-oil latices for at least about 24 hours at about 20° C. As used herein, the term "shelf stable" means stable for at least 6 months.

As used herein, the term "invertible latex" means a w/o latex additionally including inverting surfactants, the inverting surfactants comprising at least a first inversion surfactant and a second inversion surfactant, the first inversion surfactant being ionic and having an HLB of at least about 15, the second inversion surfactant being nonionic and having an HLB of between about 8 and 20.

As used herein, the term "invert" or "inversion" as applied to the w/o latices of the invention means to contact an invertible latex with a water source in an amount sufficient to form a polymer flooding solution.

As used herein, the term "dilute latex" means a polymer solution or dispersion of about 100 ppm (0.01 wt %) to 10,000 ppm (1.00 wt %) resulting from the dilution of an invertible latex.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Water-in-Oil Latices

We have found combinations of inverting surfactants that provide rapid and complete inversion of water-in-oil (w/o) latices of ionic water soluble polymers under conditions wherein the water source used to invert the latex is provided at high temperature, or includes a high level of total dissolved solids, or is both high temperature and high total dissolved solids. The w/o latices useful in conjunction with the compositions and methods of the invention are conventional latices employed in one or more EOR applications, wherein the inverting surfactants are added to the w/o latices to facilitate inversion to yield a polymer solution for EOR. Polymer solutions for EOR conventionally target a concentration of about 1.00 wt % or less. The compositions and methods of the invention are easily carried out using conventional materials and equipment familiar to one of skill in w/o latex formation for EOR.

Polymers useful in the w/o latices include conventional EOR polymers as well as variations, mixtures, or derivatives thereof. The invention is not particularly limited as to the polymer employed in the water phase of the w/o latices, however, in embodiments the polymer is water soluble or fully dispersible to result in increased viscosity suitable for one or more EOR applications at concentrations of 1 wt % or less. Thus, polyacrylamides, polyacrylates, copolymers thereof, and hydrophobically modified derivatives of these (associative thickeners) are the most commonly employed EOR polymers; all are usefully employed in the w/o latices. Associative thickeners typically include about 1 wt % or less, based on total weight of dry polymer, of a monomer having a long-chain hydrocarbyl functionality intended to produce physical or associative crosslinking in a waterbased polymer dispersion. Such hydrophobically associating moieties are well known in the industry. In some embodiments, the hydrocarbyl functionality includes 8 to 20 carbons, or 10 to 20 carbons, or 12 to 20 carbons arranged in a linear, branched, or cyclic conformation. In some embodiments, the hydrophobically associating monomers are present in the polymer compositions at about 1 wt % or less of the total weight of the polymer composition, for example about 0.01 wt % to 1.00 wt %, or about 0.1 wt % to 1.00 wt %, or about 0.20 wt % to 1.00 wt % of the total weight of the polymer composition.

Other monomers usefully incorporated into the polymers and copolymers with acrylamide, acrylic acid, or both include cationic monomers, anionic monomers, and nonionic monomers. Nonlimiting examples of cationic monomers include N,N-diallyl-N,N-dimethylammonium chloride (DADMAC), N-alkyl ammonium salts of 2-methyl-1-vinyl imidazole, N-alkyl ammonium salts of 2-vinyl pyridine or 4-vinyl pyridine, N-vinyl pyridine, and trialkylammonium alkyl esters and amides derived from acrylic acid or acrylamide, respectively. Nonlimiting examples of anionic monomers include methacrylic acid, 2-acrylamido-2-methylpropane sulfonic acid (AMS), vinylphosphonic acid, and vinyl sulfonic acid and conjugate bases or neutralized forms thereof (salts). Nonlimiting examples of nonionic monomers include methacrylamide and alkyl ester or amide derivatives of acrylic acid or acrylamide, such as N-methyl acrylamide or butyl acrylate.

The polymer includes at least about 50 mole % acrylamide content. In some embodiments, the polymer includes a net anionic or cationic charge. Net ionic charge is the net positive (cationic) or negative (anionic) ionic content of the polymer, based on number of moles of one or more ionic monomers present in the polymer. Thus, a copolymer of acrylic acid and acrylamide is a net negatively charged polymer since acrylic acid is an anionic monomer and acrylamide is a nonionic monomer. A copolymer of acrylic acid (anionic monomer), acrylamide (nonionic monomer), and DADMAC (cationic monomer) has a net cationic charge when the molar ratio of acrylic acid:DADMAC is less than 1 and a net anionic charge when the molar ratio of acrylic acid:DADMAC is greater than 1. Both net anionic and net cationic charge EOR polymers are addressed by the w/o latices of the invention. One commercially important anionic polymer is partially hydrolyzed polyacrylamide (HPAM), that is, a polymer synthesized using only acrylamide and subsequently subjected to alkaline hydrolytic conditions. Thus, HPAM is similar to a copolymer of acrylamide and acrylic acid wherein the acrylic acid or acrylate content is present as a result of the hydrolysis of amide groups on the polymer. While not limited thereto, commercial HPAM copolymers typically include about 30 mol % acrylate content.

Polymers employed for EOR are desirably very high molecular weight, as conventionally employed in EOR applications. Higher molecular weight increases the efficacy of the polymers in viscosifying water. However, higher molecular weight also increases difficulty in dissolution due to the high level of chain entanglement between polymer strands as well as strong hydrogen bonding between polymer functionalities such as amides and carboxylates.

In embodiments, the polymers usefully incorporated in the w/o latices have an average molecular weight of about $5 \times 10^5$ g/mol to $1 \times 10^8$ g/mol, or about $1 \times 10^6$ g/mol to $5 \times 10^7$ g/mol, or about $1 \times 10^6$ g/mol to $3 \times 10^7$ g/mol, or about $3 \times 10^6$ to $3 \times 10^7$ g/mol as determined by converting intrinsic viscosity to molecular weight using the Mark-Houwink equation. In order to determine the intrinsic viscosity, the reduced viscosity at various concentrations is measured by means of a capillary viscometer. The intrinsic viscosity is obtained by extrapolation to zero concentration of the reduced viscosity. The Mark-Houwink equation is employed to calculate average molecular weight, using constants k and a consistent with acrylamide-based polymers where water is the solvent:

$$h = kM^a$$

where: h=intrinsic viscosity
M=average molecular mass
k=$3.73 \times 10^{-4}$
a=0.66

In some embodiments, the polymers usefully incorporated in the w/o latices have an intrinsic viscosity of about 5 dL/g to 50 dL/g, or about 10 dL/g to 30 dL/g.

In embodiments, the polymer has at least about 50 mole % acrylamide content, that is, about 50% to 100% of the polymer repeat units attributable to acrylamide, for example about 55 mole % to 100 mole %, or about 60 mole % to 100 mole %, or about 65 mole % to 100 mole %, or about 70 mole % to 100 mole %, or about 75 mole % to 100 mole %, or about 80 mole % to 100 mole %, or about 85 mole % to 100 mole %, or about 90 mole % to 100 mole %, or about 95 mole % to 100 mole %, or about 50 mole % to 95 mole %, or about 50 mole % to 90 mole %, or about 50 mole % to 85 mole %, or about 50 mole % to 80 mole %, or about 50 mole % to 75 mole %, or about 50 mole % to 70 mole %, or about 50 mole % to 65 mole %, or about 50 mole % to 60 mole %, or about 50 mole % to 55 mole % repeat units attributable to acrylamide.

In embodiments, one or more polymers are present substantially within the water phase in an w/o latex. In embodiments, the polymers are present within the w/o latices at about 15 wt % to 50 wt % based on the total weight of the w/o latex, or about 17 wt % to 50 wt %, or about 19 wt % to 50 wt %, or about 21 wt % to 50 wt %, or about 23 wt % to 50 wt %, or about 25 wt % to 50 wt %, or about 15 wt % to 48 wt %, or about 15 wt % to 46 wt %, or about 15 wt % to 44 wt %, or about 15 wt % to 42 wt %, or about 15 wt % to 40 wt %, or about 15 wt % to 38 wt %, or about 15 wt % to 36 wt %, or about 25 wt % to 45 wt %, or about 30 wt % to 40 wt % based on the total weight of the w/o latex.

The polymers present within the water phase of a w/o latex are often, though not exclusively, formed in situ by dissolving one or more monomers in the water phase, then adding the water phase to an oil phase bearing an emulsifying surfactant to the water phase to form the latex, followed by polymerization of the monomers to form a polymer w/o latex. Such latices are widely used for EOR applications.

Also present in the w/o latex is an amount of water sufficient to form a water phase within the latex. Water is present in the w/o latex at about 10 wt % to 50 wt % based on the total weight of the latex, or about 15 wt % to 50 wt %, or about 20 wt % to 50 wt %, or about 25 wt % to 50 wt %, or about 10 wt % to 40 wt %, or about 10 wt % to 35 wt %, or about 10 wt % to 30 wt %, or about 20 wt % to 40 wt %, or about 20 wt % to 30 wt % based on the total weight of the w/o latex. In some embodiments, the water is a water source.

Also present in the w/o latex is an amount of oil sufficient to form an oil phase within the latex. In some embodiments, the oil has a flash point greater than about 90° C., or greater than about 80° C., or greater than about 70° C. In some embodiments, the oil is a mixture of compounds, wherein the mixture is less than 0.1 wt % soluble in water at 25° C. and is substantially a liquid over the range of 20° C. to 100° C. In some embodiments, the oil comprises, consists essentially of, or consists of one or more linear, branched, or cyclic hydrocarbon moieties, aryl or alkaryl moieties, or combinations of two or more such moieties. In some embodiments, the oil has a density of about 0.7 g/L to 1.0 g/L, for example about 0.8 g/L to 0.9 g/L. Examples of suitable oils include decane, dodecane, isotridecane, cyclohexane, toluene, xylene, and mixed paraffin solvents such as those sold under the trade name ISOPAR® by ExxonMobil Corp. of Irving, Tex. In embodiments, the oil is present in the w/o latex at about 15 wt % to 30 wt % based on the total weight of the w/o latex, or about 17 wt % to 30 wt %, or about 19 wt % to 30 wt %, or about 21 wt % to 30 wt %, or about 23 wt % to 30 wt %, or about 25 wt % to 30 wt %, or about 15 wt % to 28 wt %, or about 15 wt % to 26 wt %, or about 15 wt % to 24 wt %, or about 20 wt % to 25 wt % based on the total weight of the w/o latex.

Also present in the w/o latex is one or more latex emulsifying surfactants. Latex emulsifying surfactants are employed to form and stabilize the w/o latices during polymerization and to maintain latex stability until inversion. Generally the latex emulsifying surfactant is present at about 5 wt % or less based on the weight of the latex. Conventionally employed surfactants for w/o latices used for EOR applications include nonionic ethoxylated fatty acid esters, ethoxylated sorbitan fatty acid esters, sorbitan esters of fatty acids such as sorbitan monolaurate, sorbitan monostearate, and sorbitan monooleate, block copolymers of ethylene oxide and hydroxyacids having a $C_{10}$-$C_{30}$ linear or branched hydrocarbon chain, and blends of two or more of these targeted to achieve a selected hydrophilic/lipophilic balance (HLB). Those of skill will understand that a plethora of surfactants are employed throughout the industry to form and stabilize w/o latices, serving as a medium for polymerization of monomers and further maintaining emulsion stability of the polymer formed therein until subsequent use in the field. Any nonionic surfactants and blends thereof conventionally employed in w/o latices for EOR applications are suitably employed in conjunction with the present invention. In embodiments, the latex emulsifying surfactant is a single nonionic surfactant or blend thereof having a combined HLB value of about 2 to 10, for example about 3 to 10, or about 4 to 10, or about 5 to 10, or about 6 to 10, or about 7 to 10, or about 8 to 10, or about 2 to 9, or about 2 to 8, or about 2 to 7, or about 2 to 6, or about 2 to 5, or about 3 to 9, or about 4 to 8.

Representative amounts of the above listed materials are suitably included in one or more w/o latices useful to stabilize one or more EOR applications, wherein the amounts are suitably selected to provide optimal kinetic stability of the emulsion. Representative amounts of these materials are shown below, wherein these amounts are intended to be representative of the w/o latices useful in conjunction with the methods and materials of the invention. Useful w/o latices are not limited to those shown below. Where amounts listed below do not add up to 100 wt %, one or more additional components are also present in the latex.

| | | Amount in a w/o Latex, wt % | | | |
|---|---|---|---|---|---|
| Phase | Material | Latex 1 | Latex 2 | Latex 3 | Latex 4 |
| Oil | Oil (solvent) | 30 | 25 | 15 | 20 |
| | Latex emulsifying surfactant | 5 | 3 | 2 | 1 |
| Water | Monomer or Polymer | 15 | 25 | 50 | 35 |
| | Water | 50 | 40 | 25 | 40 |

The w/o latices optionally include one or more additives. Salts, buffers, acids, bases, dyes, antifoams, viscosity stabilizers, metal chelators, chain-transfer agents, and the like are optionally included in the w/o latices. In some embodiments, the additives include one or more corrosion inhibitors, scale inhibitors, emulsifiers, water clarifiers, hydrogen sulfide scavengers, gas hydrate inhibitors, biocides, pH modifiers, antioxidants, asphaltene inhibitors, or paraffin inhibitors. While the amount of an additive usefully employed in the w/o latex depends on the additive and the intended application, in general the amount of any individual additive is about 0 wt % to 5 wt % based on the total weight of the w/o latex, or about 0 wt % to 4 wt %, or about 0 wt % to 3 wt %, or about 0 wt % to 2 wt %, or about 0 wt % to 1 wt % based on the total weight of the latex.

In embodiments, the w/o latices are made using conventional equipment and methodology. Thus, in embodiments a w/o latex containing the monomers is formed and the polymerization is conducted within the water phase of the latex. In other embodiments the polymer is formed in a water solution, and the solution is used to form a w/o latex. In such embodiments, the w/o latex is formed after polymerization is complete by adding one or more surfactants and one or more oils to the waterbased polymer composition and emulsifying the combined components as described above.

Surfactant Compositions

We have found surfactant compositions that when added to conventional w/o latices of water soluble ionic polymers form invertible latices. The invertible latices are characterized by the rapid and complete inversion thereof under conditions wherein the water source used to invert the latex is about 60° C. to 100° C. Further, The invertible latices are characterized by the rapid and complete inversion thereof under conditions wherein the water source used to invert the latex includes about 0.5 wt % to 30 wt % total dissolved solids. Still further, the invertible latices are characterized by the rapid and complete inversion thereof under conditions wherein the water source used to invert the latex is about 60° C. to 100° C. and further includes about 0.5 wt % to 30 wt % total dissolved solids.

In embodiments, surfactant compositions of the invention comprise, consist essentially of, or consist of a first inversion surfactant and a second inversion surfactant. In some embodiments, the first and second inversion surfactant are two separate compositions added to a w/o latex in separate processes or steps. In embodiments, the first inversion surfactant has an HLB (hydrophilic-lipophilic balance) of greater than about 15 and the second inversion surfactant has an HLB of between about 8 and 20. In embodiments, the first inversion surfactant is ionic; in some such embodiments the first inversion surfactant is cationic. In embodiments, the second inversion surfactant is nonionic. In some embodiments, the first inversion surfactant is cationic and the net charge of the polymer is anionic. In some embodiments, the first inversion surfactant is anionic and the net charge of the polymer is cationic. In some embodiments, the first inversion surfactant, second inversion surfactant, or both are blends of two or more surfactants having a targeted functionality (ionic or nonionic), further wherein the surfactant combination has an HLB in the targeted range.

Surfactants are often characterized by HLB. High HLB values indicate good water or polar solvent solubility of the surfactant while low HLB values are indicative of good solubility in non polar systems, such as oils. HLB is calculated using the Griffin formula for nonionic surfactants:

$$HLB = 20 \times MWH/(MWH+MWL) = wt\% \text{ hydrophile}/5$$

where MWH=mol. wt. of hydrophile
MWL=mol. wt. of hydrophobe

Thus, for example, a C10 ethoxylated alcohol bonded to 8 ethylene oxide repeat units has an HLB of 13.83:

Hydrophobe: $CH_3(CH_2)_9$—OH; MW=158. Hydrophile: $[CH_2CH_2O]_8$; MW=352. Therefore HLB=20×352/(352+158)=13.83.

HLB is calculated using the Davies formula for ionic surfactants, wherein HLB is the sum of the hydrophilic group contributions, minus the sum of the hydrophobic group contributions, plus 7. Group contributions are listed, for example, in Akzo Nobel Surface Chemistry LLC, Publication SC-11-02 *"HLB and Emulsification"*, © 2011 by Akzo Nobel Surface Chemistry LLC.

As temperature varies, the HLB value of a surfactant may also vary. Notably, HLB values reported or referred to herein refer to values obtained at common ambient temperatures, e.g. 20° C. to 25° C. unless otherwise noted.

The first inversion surfactant comprises, consists essentially of, or consists of an ionic surfactant or blend thereof having an HLB of at least 15. The ionic charge of the first inversion surfactant can be selected to be either cationic or anionic but is preferably cationic. In some embodiments the HLB of the first inversion surfactant is about 15 to 35, or about 20 to 35, or about 21 to 35, or about 22 to 35, or about 23 to 35, or about 24 to 35, or about 25 to 35, or about 26 to 35, or about 27 to 35, or about 28 to 35, or about 20 to 34, or about 20 to 33, or about 20 to 32, or about 20 to 31, or about 20 to 30, or about 20 to 29, or about 20 to 28, or about 25 to 35, or about 25 to 30. In embodiments, in order to accomplish inversion of a w/o latex, the first inversion surfactant is added to a latex at about 0.1 wt % to 2.0 wt % based on the total weight of the w/o latex, or about 0.2 wt % to 2.0 wt %, or about 0.3 wt % to 2.0 wt %, or about 0.4 wt % to 2.0 wt %, or about 0.5 wt % to 2.0 wt %, or about 0.6 wt % to 2.0 wt %, or about 0.1 wt % to 1.8 wt %, or about 0.1 wt % to 1.6 wt %, or about 0.1 wt % to 1.4 wt %, or about 0.1 wt % to 1.2 wt %, or about 0.1 wt % to 1 wt %, or about 0.1 wt % to 0.8 wt %, or about 0.1 wt % to 0.6 wt %, or about 0.1 wt % to 0.4 wt %, or about 0.1 wt % to 0.3 wt %, or about 0.2 wt % to 0.8 wt %, or about 0.3 wt % to 0.7 wt %, or about 0.3 wt % to 0.6 wt % based on the total weight of the w/o latex.

In some embodiments, the first inversion surfactant is a quaternary ammonium surfactant. In embodiments, the quaternary ammonium surfactant includes ethoxy groups, propoxy groups, or both ethoxy and propoxy groups. In some embodiments, the quaternary ammonium surfactant includes at least one linear or branched hydrocarbon chain having 6 to 22 carbons. Examples of suitable quaternary ammonium surfactants useful as the first inversion surfactant include those sold under the product name ETHOQUAD® by Akzo Nobel N.V. of Amsterdam, the Netherlands and include ETHOQUAD® C/12 (HLB=25.8), ETHOQUAD® HT/25 (HLB=28.3), ETHOQUAD® O/12 (HLB=23.4), ETHOQUAD® C/12B (HLB=23.7), and ETHOQUAD® 18/25 (HLB=28.0). In some embodiments the quaternary ammonium surfactant is N,N-bis [polyoxyethylene]-methyloctadecylammonium chloride with a total of about 15 ethylene oxide units divided between two polyglycol substituents on the nitrogen. While the anionic counter ion is typically a chloride ion, bromide, sulfate, methylsulfate, and the like are also acceptable and useful.

The second inversion surfactant comprises, consists essentially of, or consists of a nonionic surfactant or blend thereof having an HLB of about 8 to 20, or about 8 to 19, or about 8 to 18, or about 8 to 17, or about 8 to 16, or about 8 to 15, or about 9 to 20, or about 10 to 20, or about 11 to 20, or about 12 to 20, or about 13 to 20, or about 14 to 20, or about 11 to 19, or about 12 to 18, or about 13 to 17, or about 13 to 16. In some embodiments, the second inversion surfactant includes one or more compounds comprising one or more ethoxy groups, propoxy groups, or a combination thereof. In some embodiments, the second inversion surfactant includes a linear or branched $C_9$-$C_{20}$ hydrocarbyl moiety, $C_{12}$-$C_{15}$ hydrocarbyl moiety, or a $C_{13}$ hydrocarbyl moiety. In some such embodiments, the second inversion surfactant is an alkoxylated alcohol such as an ethoxylated, propoxylated, or ethoxylated/propoxylated alcohol, wherein the alcohol includes a linear or branched $C_9$-$C_{20}$ hydrocarbyl moiety, $C_{12}$-$C_{15}$ hydrocarbyl moiety, or even a $C_{13}$ hydrocarbyl moiety. In some embodiments, the second inversion surfactant includes at least 7 ethylene oxide (ethoxylate, or EO) units. In some embodiments, the second inversion surfactant includes at least 7 ethylene oxide (ethoxylate, or EO) units and is end-capped with at least 2 propylene oxide (propoxylate, or PO) units. One example of a suitable second inversion surfactant is a $C_{13}$-alcohol polyalkylene glycol ether, such as MARLOX® N 92, available from Sasol Olefins & Surfactants GmbH of Hamburg, Germany. The HLB of MARLOX® N 92 is calculated as 10.4 if the propylene glycol component is counted as hydrophobic, or as 15.3 if the propylene glycol is counted as hydrophilic.

In embodiments, the second inversion surfactant is added to the w/o latex in an amount corresponding to about 0.2 wt % to 4.0 wt % based on the total weight of the w/o latex including the first inversion surfactant, or about 0.3 wt % to 4.0 wt %, or about 0.4 wt % to 4.0 wt %, or about 0.5 wt % to 4.0 wt %, or about 0.6 wt % to 4.0 wt %, or about 0.7 wt % to 4.0 wt %, or about 0.8 wt % to 4.0 wt %, or about 0.9 wt % to 4.0 wt %, or about 1.0 wt % to 4.0 wt %, or about 0.2 wt % to 3.5 wt %, or about 0.2 wt % to 3.0 wt %, or about 0.2 wt % to 2.5 wt %, or about 0.2 wt % to 2.0 wt %, or about 0.5 wt % to 2.5 wt %, or about 1.0 wt % to 2.0 wt % based on the total weight of the w/o latex including the first inversion surfactant.

Invertible Latices

Addition of the first and second inversion surfactant to a conventional w/o latex results in an invertible latex of the invention. In some embodiments, the invertible latex is formed by adding the first inversion surfactant to the w/o latex, followed by adding the second inversion surfactant to the latex. We have observed that, with suitable selection of the inverting surfactants at suitable concentrations and with blending techniques known to those skilled in the art, the invertible latices of the invention are shelf stable. That is, the invertible latices of the invention do not exhibit any observed signs of gross phase separation, coagulation, or precipitation after six months at ambient laboratory temperatures.

In some embodiments, the first inversion surfactant is prepared for addition to a w/o latex by diluting in a water source to form a first inversion surfactant solution. Where a first inversion surfactant solution is employed, the solution includes about 10 wt % to 50 wt % of the first inversion surfactant, or about 15 wt % to 50 wt %, or about 20 wt % to 50 wt %, or about 25 wt % to 50 wt %, or about 30 wt % to 50 wt %, or about 10 wt % to 45 wt %, or about 10 wt % to 40 wt %, or about 10 wt % to 35 wt %, or about 10 wt % to 30 wt %, or about 20 wt % to 40 wt %, or about 25 wt % to 35 wt % of the first inversion surfactant. The first inversion surfactant solution is added to the polymer latex in a single aliquot, or continuously or stepwise over time. In other embodiments, the first inversion surfactant is added neat to the latex.

In some embodiments, the first inversion surfactant or first inversion surfactant solution is added to the latex to result in an intermediate latex. The intermediate latex is stable. The intermediate latex is shelf stable. In some embodiments, the intermediate latex is stable for longer than six months, for example about one year, two years, or longer. In some embodiments, the second inversion surfactant is added to the intermediate latex immediately after the intermediate latex is formed; in other embodiments, the intermediate latex is stored and/or transported to the use location and the second inversion surfactant is added to the intermediate latex or to the source water at the time of inversion.

In some embodiments, the second inversion surfactant is added to the intermediate latex to form an invertible latex. The second inversion surfactant is added to the intermediate latex at any time after addition of the first inversion surfactant. Thus, in some embodiments, addition of the second inversion surfactant is suitably carried out just prior to inversion of the latex, or concomitantly with the inversion to form a dilute latex. In other embodiments, the second inversion surfactant is added to the intermediate latex to form the invertible latex, and the invertible latex is stored for a period of about 24 hours to 6 months or longer prior to initiation of inversion. It is a feature of the invention that the invertible latex is stable under common ambient conditions for at least 24 hours at 20° C.-25° C.

In some embodiments, the second inversion surfactant is dissolved in water prior to addition to the intermediate latex, and the water solution of second inversion surfactant is added to the intermediate latex to result in formation of the invertible latex. In other embodiments, the second inversion surfactant is added neat to the intermediate latex with stirring.

In some embodiments, the first and second inversion surfactants are combined prior to addition of the surfactant composition to the w/o latex. In some such embodiments, additional oil, additional water, or both are included in the combination. In other embodiments, the second inversion surfactant is added to the polymer latex before the first inversion surfactant. In some embodiments, the first inversion surfactant, second inversion surfactant, or both are added neat to the polymer latex. In other embodiments, the first inversion surfactant, second inversion surfactant, or both are provided as waterbased solutions for addition to the polymer latex. The addition strategy is adjusted as needed to prevent localized high inverting surfactant concentrations that could cause the dispersed phase to aggregate.

Inversion of the Invertible Latices

The invertible latices of the invention invert rapidly and completely when contacted with a water source having high temperature, high total dissolved solids, or both to yield a dilute latex. Numerous advantages are realized by use of the invertible latices of the invention; principal of these is the time savings realized when rapid and complete inversion replaces multi-step, slow, or incomplete inversion in the field. Both the invertible latices and the resulting dilute latices are characterized by the absence of the manifestations of latex or inversion instability; avoiding latex or inversion instability prevents downtime in the field necessitated by plugged or fouled equipment.

During inversion, a water source is contacted with a invertible latex in one or more steps including one or more mixing and/or shearing processes to result in a dilute latex having 1 wt % polymer or less. It is a feature of the invention that the invertible latices of the invention provide for a simple, one-step inversion process characterized by absence of instabilities manifested as coagulation or precipitation of polymer or gross phase separation of the water phase from the oil phase prior to dissolution. It is a feature of the invention that the invertible latices of the invention provide for a simple, one-step inversion process in the presence of water sources contacted with the invertible latex at temperatures of about 60° C. to 100° C. It is a feature of the invention that the invertible latices of the invention provide for a simple, one-step inversion process in the presence of water sources contacted with the invertible latex wherein the water source contacting the invertible latex includes about 0.5 wt % to 30 wt % total dissolved solids. It is a feature of the invention that the invertible latices of the invention provide for a simple, one-step inversion process wherein the water source contacting the invertible latex includes about 0.5 wt % to 30 wt % total dissolved solids and further contacts the inversion composition at about 60° C. to 100° C. During the inversion process, the presence of the first inversion surfactant, the second inversion surfactant, or the combination thereof reduce or prevent the coagulation of the polymer in the dilute latex.

The dilute latex typically includes about 0.01 wt % to 1.00 wt % of polymer, other (residual) compounds from the inverted latex, and any dissolved solids present in the water source. The dilute latices of the invention are characterized by absence of gel particles, absence of gross phase separation, and/or absence other manifestations of inversion instability of w/o latices.

Inversion of the invertible latices to form the dilute latices is accomplished using conventional techniques and equipment, which is an unexpected benefit of employing the surfactant composition of the invention. Additionally, inversion of invertible latices to form the dilute latices is accomplished, wherein peak viscosity of the polymer in the diluted latex is reached within about 1 minute to 60 minutes, for example about 1 minute to 50 minutes, or about 1 minute to 40 minutes, or about 1 minute to 30 minutes, or about 1 minute to 20 minutes, or about 1 minute to 15 minutes, or about 2 minutes to 60 minutes, or about 3 minutes to 60 minutes, or about 4 minutes to 60 minutes, or about 5 minutes to 60 minutes, or about 10 minutes to 60 minutes, or about 15 minutes to 60 minutes, or about 20 minutes to 60 minutes, or about 2 minutes to 30 minutes, or about 2 minutes to 20 minutes, or about 2 minutes to 15 minutes. Finally, in some embodiments, inversion of invertible latices to form the dilute latices is suitably accomplished in a single step including dilution and mixing of the invertible latex with the water source to the target polymer concentration in the dilute latex. In other embodiments, inversion of invertible latices to form the dilute latices is suitably accomplished in two dilution/mixing steps to reach the target polymer concentration. In some embodiments, starting with the invertible latex, the dilution to a target concentration of 0.01 wt % to 1 wt % is accomplished in about 1 to 15 minutes, for example about 1 to 14, 1 to 13, 1 to 12, 1 to 11, 1 to 10, 1 to 9, 1 to 8, 1 to 7, 1 to 6, 1 to 5, 2 to 15, 3 to 15, 4 to 15, 5 to 15, 6 to 15, 7 to 15, 8 to 15, 9 to 15, 10 to 15, 2 to 10, 2 to 9, 2 to 8, 3 to 10, 3 to 9, 3 to 8, 4 to 10, 4 to 9, 4 to 8, or 4 to 7 minutes.

After inversion, the dilute latices comprise about 100 ppm to 10,000 ppm (0.01 wt % to 1.00 wt %) polymer, or about 200 ppm to 5000 ppm, or about 200 ppm to 4000 ppm, or about 200 ppm to 3000 ppm, or about 200 ppm to 2500 ppm polymer. In some embodiments the water source contacts the invertible latex at a temperature of about 60° C. to 100° C. In other embodiments, the water source includes about 0.5 wt % to 30 wt % total dissolved solids. In still other embodiments, the water source includes about 0.5 wt % to 30 wt % total dissolved solids and further contacts the inversion composition at about 60° C. to 100° C.

A water source is water or a water solution having from about 0.5 wt % to about 30.0 wt % total dissolved solids (TDS), or about 0.5 wt % to 29.0 wt %, or about 0.5 wt % to 28.0 wt %, or about 1.0 wt % to 27.0 wt %, or about 2.0 wt % to 25.0 wt %, or about 3.0 wt % to 20.0 wt % TDS. Thus in embodiments a water source includes one or more dissolved solid materials including but not limited to salts, ions, buffers, acids, bases, surfactants, compounds employed in the water used in mining operations, or other dissolved, dispersed, or emulsified compounds, materials, components, or combinations thereof. Non-limiting examples of water sources include hard water, produced water from mining operations, brackish water, sea water, municipal waste water, tap water, "gray water", and the like. Water sources having high TDS and high temperature are often encountered in use for EOR applications. For example, hydraulic fracturing and conventional oil recovery often results in produced water having high TDS, temperatures in excess of 60° C., or both; rather than use fresh water, in such situations it is economical to reuse the produced water as the water source for w/o inversion.

In some embodiments, the method of inverting the invertible latices involves conventional inverting equipment. While inverting an latex is often accomplished in the field using high shear, stepwise dilution for efficiency in achieving full dilution and hydration of a polymer at the desired use level, we have found that relatively low shear mixing is advantageous in some embodiments for inverting the invertible latices of the invention. Such techniques are advantageous because avoiding some or all shear on the polymer chains during dissolution results in a higher final viscosity of the dilute latices by reducing or eliminating chain scission of the high molecular weight polymers. It is a feature of the invertible latices of the invention that low-shear techniques that avoid substantial amounts of chain scission are suitably used in rapid inversion to result in dilute latices characterized by lack of manifestations of instability as discussed above.

Further, we have found that it is possible to employ a single step inversion of the invertible latices by employing the surfactant combination of the invention: that is, a single dilution step with a water source is usefully employed to dilute the invertible latices to form a dilute latex at the final use concentration of about 100 ppm to 10,000 ppm. No intermediate or step-down dilution is required to form the dilute latex. Previous efforts have required at least two dilution steps, with mixing after each step, to facilitate inversion of w/o latices in order to provide complete hydration of the polymer during and after dilution. After a single inverting step, the dilute latices of the invention are characterized by substantially full viscosity and by the substantial absence of gels and solution instabilities in the field. This finding is significant because conventional w/o latices, subjected to a single dilution step in the field, result in incomplete hydration and lower viscosity and/or in substantial gel particles and/or solution instabilities that cause plating out or plugging of equipment used to carry out EOR by polymer flooding. Conventional water-in-oil EOR latices require two or more dilution steps and up to several hours to complete inversion to result in a homogeneous polymer solution.

In some embodiments, after the invertible latices are contacted with water source to form a dilute latex in a single dilution step, the polymer continues to build viscosity for about 1 minute to 120 minutes, or about 2 minutes to 110 minutes, or about 5 minutes to 100 minutes, or about 10 minutes to 90 minutes, or about 15 minutes to 80 minutes, or about 5 minutes to 70 minutes, or about 10 minutes to 70 minutes, or about 20 minutes to 70 minutes, or about 30 minutes to 70 minutes, or about 40 minutes to 70 minutes, or about 50 minutes to 70 minutes, or about 5 minutes to 60 minutes, or about 10 minutes to 60 minutes, or about 20 minutes to 60 minutes, or about 30 minutes to 60 minutes, or about 40 minutes to 60 minutes.

The polymer solutions formed using the invertible latices of the invention are characterized by the substantial absence of gel particulates, as determined by filtration quotient (or Filter Ratio) of the polymer solutions. The FR test used consists of measuring the time taken by given volumes of solution containing 1000 ppm polymer to flow through a filter. The solution is contained in an aluminum bell housing (Filter housing #142-59, obtained from OFI Testing Equipment Inc. of Houston, Tex.), pressurized to 20 psi and the filter has a diameter of 90 mm and a pore size of 5 microns. The filter composition is a Millipore hydrophilic mixed cellulose ester type, catalog number SMWP9025. The times required to obtain 90 ml (t90 ml); 120 ml (t120 ml) and 180 ml (t180 ml) and 210 ml (t210 ml) of filtrate are therefore measured and FR is expressed as:

$$FR = \frac{t210 \text{ ml} - t180 \text{ ml}}{t120 \text{ ml} - t90 \text{ ml}}$$

The FR thus represents the capacity of the polymer solution to plug the filter for two equivalent consecutive volumes. A typical acceptability criterion of the industry is FR<1.5. Conventional w/o latices employed for formation of polymer flooding solutions cannot achieve this level of filterability even after several hours of stirring in the laboratory when prepared directly at concentrations of 1000 ppm in a water source with a total TDS of 0.5 wt % to 30 wt % and/or in water at a temperature of 60° C. to 100° C. However, the invertible latices of the invention are characterized in that FR<1.5 is suitably achieved in about 30 minutes or less when a water source is contacted with a invertible latex of the invention and mild shear is applied to aid in disentangling the polymer chains. For example, complete inversion and hydration occurs in about 1 to 30 minutes, or about 1 to 15 minutes, or about 1 to 5 minutes, or about 5 to 15 minutes, or about 5 to 20 minutes, or about 10 to 30 minutes.

In a non-limiting example of an EOR application, a w/o latex is applied to a reservoir as follows. An invertible latex is introduced at a quantity sufficient to produce the desired dilute polymer concentration via an injection quill into a pipeline through which is flowing a water source with a total dissolved solids content of greater than 0.5 wt. % and/or at a temperature greater than 60° C. Optionally, immediately downstream of the injection quill and in fluid communication therewith resides a static mixer that is sized to provide at least about 1 Bar pressure drop across the mixer. Downstream from the optional static mixer resides a pipeline to the oil-bearing formation, said pipeline being of sufficient length to provide a minimum of 15 minutes residence time and said pipeline being of correct diameter for a given flow rate to provide sufficient turbulence to aid in disentangling the polymer chains to provide a homogeneous injectable polymer solution.

Inversion of the invertible latices is suitably carried out using conventional equipment and methods used to invert latices in the field. Employing conventional equipment and methods familiar to those of skill in inverting w/o latices for EOR applications, it is possible to invert the invertible latex to full viscosity in less than 30 minutes, for example about 1 minute to 30 minutes, or about 1 minute to 15 minutes, or about 5 minutes to 15 minutes, or about 10 minutes to 25 minutes, or about 15 minutes to 30 minutes.

In some embodiments, inversion is suitably carried out by subjecting the invertible latices of the invention to a single-step inversion by diluting the latices with a water source and efficiently mixing the water source and the invertible latex in a single step. Devices suitable to achieve a one-step inversion include those described in U.S. Pat. No. 7,785,442, which is incorporated by reference herein in its entirety.

While the foregoing description is centered on EOR applications, water soluble polymers and latices thereof are also usefully employed in one or more papermaking applications using a Fourdrinier or inclined Fourdrinier apparatus, wherein waterbased furnishes dispensed onto a wire can include an EOR-type polymer to improve the rheological profile of the furnish as dictated by machine or application parameters. In such applications, the invertible latices of the invention are advantageously employed due to rapid inversion upon addition to a furnish (a waterbased dispersion of fibers) to result in a dilute latex similar to those described above. In papermaking applications, it is desirable to use tap water, recycled white water, or another waterbased solution to form the furnish and the w/o latices of the invention are suitable for use with waterbased furnishes employing waterbased solutions having high TDS, at elevated temperatures, or both. Papermaking includes making paper—that is, cellulose based nonwoven mats—as well as other nonwoven fibrous mats such as filtration media that employ e.g. thermoplastic and glass fibers in addition to or instead of cellulose based fibers. One of skill will appreciate that other industrial uses of the w/o latices of the invention are similarly envisioned.

EXPERIMENTAL

Latex Formation

The latex polymers used in the Examples below are made using the following general synthetic procedure.

An oil phase is prepared by charging to a 1.5-liter reactor, 250 g of Isopar M, 12 g of Span 80 and 7.5 g of Tween 61 emulsifying surfactants. The ratio and chemistry of the surfactants is varied depending on the targeted HLB of the blend. Thus, for some selected monomer types and ratios, the HLB of the blend is targeted to be about 8; in other monomer types and/or ratios, an HLB of less than 8 is targeted.

An aqueous monomer phase is prepared separately in a 1-liter beaker by combining 375 g of 50% aqueous acrylamide, 81.5 g of acrylic acid, and 145 g of water followed by slow addition of 90 g of 50% sodium hydroxide; the rate of addition is sufficient to maintain the solution temperature below 35° C. The pH is adjusted to 7.0-7.5. Then 0.8 g of sodium formate and 0.1 g of sodium EDTA are added. This monomer blend targets a 70/30 ratio of acrylamide/acrylate, if no further hydrolysis of acrylamide results.

The reactor stir speed is adjusted to 800 rpm and the aqueous monomer phase is added to the reactor to create the water-in-oil emulsion. The emulsion is stabilized at 42° C., then 0.3 g of AIBN (azobisisobutyronitrile) is added and a nitrogen sparge is started at 1 L/min. As the polymerization progresses, external cooling or heating is applied as needed to maintain an isothermal reaction. After three hours, the reactor temperature in increased to 75° C. and maintained at this temperature for one hour to consume unreacted monomer. The latex is then cooled to 35-40° C.

Invertible Latex Formation

After the latex is cooled, stabilizers and compounds to facilitate inversion are added to provide an all-in-one "single component" latex product. For the preparation of invertible latices in the following Examples, the latex product was filtered and packaged without the addition of inverting surfactants. Blends with surfactants and stabilizers were subsequently made on a 100 g scale to provide sample quantities for the Examples.

In a related illustrative modification of the above synthesis, the monomer phase can include 225 g of 50% aqueous acrylamide, 375 g of 80% aqueous dimethylaminoethyl acrylate quaternized with methyl chloride and 50 g of water, and a combination of Span 80 and Tween 61 targeted to provide an HLB of about 8.

Latices formed using this procedure are starting materials in the Examples that follow. For the purposes of these Examples, "invertible latex" means a latex formed according to the general synthetic procedure provided herein, but with one or more additional compounds added to the latex after polymerization to facilitate inversion. After completing the addition, the latex was stirred for an additional 5 minutes. In a non-limiting example of the preparation of an invertible latex, an aliquot of the base latex was added to a 4 oz. jar and the jar contents was stirred at 800 rpm. A waterbased solution of an ethoxylated octadecylamine-methyl chloride quaternary amine having CAS No. 28724-32-5 was previously prepared. An amount of the solution corresponding to 0.33 wt % of the quaternary amine based on the total weight of the latex was added dropwise to the latex during stirring. After addition, the intermediate latex was stirred an additional 3 minutes. Then an alkoxylated isotridecanol (CAS No. 50861-66-0) was added to the latex in an amount corresponding to 1.7 wt % of the alkoxylated isotridecanol based on the weight of the latex. After the additions were complete, the latex was observed to be stable.

Measurements

The qualitative analytical tool used in the Examples is referred to as a "torque monitor". It consists of a DC stir motor, a controller that can report the torque (DC voltage) required to maintain a constant stir speed, and a computer to record the torque reading as a function of time.

All torque monitor tests were conducted in a 600 ml jacketed Ace beaker and with an HS-1 "Jiffy Mixer" cage paddle connected to the motor. All tests were run at a 500 g solution scale and with a stir speed of 400 rpm. The water temperature was controlled with a circulating heating/cooling bath through the jacketed beaker. When the water temperature reached the target test temperature, the latex was shot into the stirred water from a disposable syringe and the torque was continuously recorded for 20 minutes. Three pieces of data were then determined: the time differential between when the latex was injected and the torque began to increase ("Induction Period"), the time until the maximum torque was reached, and the value of the maximum torque ("Hydration Period").

Test Water

Synthetic sea water was formed by blending the components of Table 2. Synthetic produced water was formed by blending the components of Table 3.

TABLE 2

| Components of synthetic seawater. | |
|---|---|
| Name | Mass (g) |
| $Na_2SO_4$ (anhy.) | 4.38 |
| $CaCl_2 \cdot 2H_2O$ | 1.57 |
| $MgCl_2 \cdot 6H_2O$ | 11.44 |
| $NaHCO_3$ | 0.01 |
| NaCl | 24.08 |
| DI water | 957.99 |

TABLE 3

| Components of produced water. | |
|---|---|
| Name | Mass (g) |
| $Na_2SO_4$ (anhy.) | 1.4 |
| $CaCl_2 \cdot 2H_2O$ | 10 |
| $MgCl_2 \cdot 6H_2O$ | 6.3 |
| KCl | 0.6 |
| NaCl | 86.6 |
| DI water | 960.1 |

Example 1

Into 96.3 g of anionic latex at ambient temperature was blended 2 g of a 16.5% aqueous solution of Ethoquad 18/25 cationic surfactant and 1.7 g of Marlox N 92 alkoxylated alcohol to form an invertible latex. The water in the torque monitor apparatus contained 9.4% salts with an equivalent hardness of 9600 ppm of $CaCO_3$ and was maintained at 80° C. Then 4.65 g of the invertible latex was injected into the stirred water to yield a dilute latex having 2500 ppm polymer. The solution viscosity of the dilute latex began to increase after an induction period of about 420 seconds. The torque was observed to reach a maximum of 23 cm-g-force at 800 seconds after the start of the induction period. At the end of the test, the dilute latex was observed to be fully dispersed, that is, no residual clumps or aggregates of material were observed.

Example 2

Into 96.3 g of the anionic latex at ambient temperature was blended 2 g of a 16.5% aqueous solution of Ethoquad 18/25 cationic surfactant and 1.7 g of Harcros T-Det-A 1312 (ethoxylated tridecyl alcohol) to yield an invertible latex. Water having 9.4% salts with an equivalent hardness of 9600 ppm of $CaCO_3$ was added to the torque monitor apparatus, and the water was maintained at 80° C. Then 4.65 g of the invertible latex was injected into the stirred water to form a dilute latex having 2500 ppm polymer. The solution viscosity of the dilute latex did not increase during the 20 minutes of the test; torque remained zero. At the end of the test, the dilute latex was observed to be fully dispersed, that is, no residual clumps or aggregates of material were observed. This indicates the latex dispersed but remained as oil-external droplets that did not invert during the test period.

Comparative Example 1

Into 97 g of the anionic latex at ambient temperature was blended 3 g of Marlox N 92 alkoxylated alcohol to form a traditional invertible latex. The water in the torque monitor apparatus contained 9.4% salts with an equivalent hardness of 9600 ppm of $CaCO_3$ and was maintained at 80° C. Then a sufficient amount of the modified latex was injected into the stirred water to form a dilute latex having about 2500 ppm polymer solids. The torque measured for the dilute latex did not increase during the 20 minutes of the test. At the end of the test, large white clumps were observed floating on the surface of the water, indicating the instability of the dilute latex and failure of the latex to invert.

Comparative Example 2

Into 97 g of the anionic latex at ambient temperature was blended 3 g of Harcros T-Det-A 1312 ethoxylated tridecyl alcohol to form a traditional invertible latex. The water in the torque monitor apparatus contained 9.4% salts with an equivalent hardness of 9600 ppm of $CaCO_3$ and was maintained at 80° C. Then an amount of the modified latex was injected into the stirred water to form a dilute latex having 2500 ppm polymer solids. The torque measured for the dilute latex did not increase during the 20 minutes of the test. At the end of the test, large white clumps were observed floating on the surface of the water, indicating the instability of the dilute latex and failure of the latex to invert.

Example 3

Comparative Example 1 was repeated but with 0.05 g of Ethoquad 18/25 cationic surfactant (1% relative to latex) added to the test water prior to injection of the modified latex (containing 3% of alkoxylated alcohol). This procedure is referred to as a "dual component" process with extra inverting surfactant added separately contemporaneously with the water used to dilute the latex. This is often done when direct mixing of the latex and a surfactant causes aggregation of the latex. Indeed, the addition of 1% Ethoquad 18/25 to a latex already containing 3% of alkoxylated alcohol causes gel particles to form in the latex.

An amount of the traditional invertible latex was injected into the surfactant-containing water to form a dilute latex having 2500 ppm polymer solids. The torque measured for the dilute latex began to increase after an induction period of 180 seconds. A maximum torque of 33 cm-g was achieved at 400 seconds.

Example 4

Comparative Example 2 was repeated but with 0.05 g of Ethoquad 18/25 cationic surfactant (1% relative to latex) added to the test water prior to injection of the traditional invertible latex (containing 3% of alkoxylated alcohol), similarly to Example 3.

The torque measured for the dilute latex including 2500 ppm polymer began to increase after an induction period of 380 seconds. A maximum torque of 28 cm-g was achieved at 500 seconds.

Comparative Example 3

Into 97 g of the anionic latex polymer at ambient temperature was blended 3 g of a 16.5% aqueous solution of Ethoquad 18/25 cationic surfactant to form a modified latex. The water in the torque monitor apparatus contained 9.4% salts with an equivalent hardness of 9600 ppm of $CaCO_3$ and was maintained at 80° C. Then the modified latex mixture was injected into the stirred water to form a dilute latex having 2500 ppm polymer. The torque measured for the dilute latex did not increase during the 20 minutes of the test. At the end of the test, the dilute latex was observed to be fully dispersed, that is, no residual clumps or aggregates of material were observed. This indicates that the latex dispersed but remained as oil-external droplets that never inverted.

Comparative Example 4

Into 94 g of the anionic latex polymer at ambient temperature was blended 6 g of a 16.5% aqueous solution of Ethoquad 18/25 cationic surfactant to form a modified latex. The water in the torque monitor apparatus contained 9.4% salts with an equivalent hardness of 9600 ppm of $CaCO_3$ and was maintained at 80° C. Then the modified latex was injected into the stirred water in the torque monitor apparatus to yield a dilute latex having 2500 ppm polymer. The torque measured for the dilute latex was observed to increase after an induction period of 150 seconds. A maximum torque of 28 cm-g was achieved at 420 seconds. At the end of the test, the dilute latex was observed to be fully dispersed, that is, no residual clumps or aggregates of material were observed. However, within 24 hours, the modified latex had aggregated into a semi-solid indicating that sufficient cationic surfactant to allow full inversion does not provide for a stable invertible latex.

Comparative Example 5

Example 1 was repeated but with Ethoquad 18/25 replaced by Ethomeen 18/25. The torque was not observed to increase during the 20 minutes of the test. At the end of the test, large white clumps were observed floating on the surface of the water, indicating the instability of the dilute latex and failure of the latex to invert.

Example 5

Into 94.7 g of the anionic latex at ambient temperature was blended 4 g of a 16.5% aqueous solution of Ethoquad 18/25 cationic surfactant and 1.3 g of Marlox N 92 alkoxylated alcohol to yield an invertible latex. The synthetic seawater in the torque monitor apparatus contained 3.5% salts with an equivalent hardness of 6600 ppm of $CaCO_3$ and was maintained at 25° C. Then an amount of the invertible latex was injected into the stirred water in the torque monitor apparatus to yield a dilute latex having 2500 ppm polymer. The torque measured for the dilute latex began to increase after an induction period of 40 seconds. A maximum torque of 90 cm-g was achieved at 600 seconds. At the end of the test, the dilute latex was observed to be fully dispersed, that is, no residual clumps or aggregates of material were observed.

Example 6

Into 94.7 g of the anionic latex at ambient temperature was blended 4 g of a 16.5% aqueous solution of Ethoquad 18/25 cationic surfactant and 1.3 g of Harcros T-Det-A 1312 ethoxylated tridecyl alcohol to form a modified latex. The seawater in the torque monitor apparatus contained 3.5% salts with an equivalent hardness of 6600 ppm of $CaCO_3$ and was maintained at 25° C. Then an amount of the modified latex was injected into the stirred water in the torque monitor apparatus to yield a dilute latex having 2500 ppm polymer. The torque was observed to increase after an induction period of 60 seconds. A maximum torque of 108 cm-g was achieved at 600 seconds. At the end of the test, the dilute latex was observed to be fully dispersed, that is, no residual clumps or aggregates of material were observed.

Example 7

The procedure of Example 4 was repeated with the modified latex of Comparative Example 2 in seawater at 25° C. The torque was observed to increase after an induction period of 45 seconds. A maximum torque of 87 cm-g was achieved at 1100 seconds. At the end of the test, the dilute latex was observed to be fully dispersed, that is, no residual clumps or aggregates of material were observed.

Comparative Example 6

Comparative Example 2 was repeated, except that only 3% T-Det A 1312 was added to the modified latex and the inversion was carried out in seawater at 25° C. The torque was observed to increase after an induction period of 45 seconds. A maximum torque of 76 cm-g was achieved at 1100 seconds.

Comparative Example 7

Comparative Example 6 was repeated but with the injection of an amount of the modified latex corresponding to 10,000 ppm polymer. 18.5 g of the latex to demonstrate the concentration effect inherent in a two-stage inversion system. The torque was observed increase after an induction period of 40 seconds. A maximum torque of 260 cm-g was achieved at 150 seconds.

Example 8

The procedure of Example 5 was repeated in seawater at 1° C. The torque was observed to increase after an induction period of 40 seconds. A maximum torque of 140 cm-g was achieved at 450 seconds. At the end of the test, the dilute latex was observed to be fully dispersed, that is, no residual clumps or aggregates of material were observed.

Example 9

The procedure Example 4 was repeated in seawater at 1° C. The torque was observed to increase after an induction period of 55 seconds. A maximum torque of 126 cm-g was achieved at 550 seconds. At the end of the test, some white latex globs remained on the stir paddle.

Comparative Example 8

Comparative Example 2 was repeated in seawater at 1° C. Torque was observed to increase after an induction period of 60 seconds. A maximum torque of 125 cm-g was achieved at 850 seconds. At the end of the test, a white globular material remained on the stir paddle.

Example 10

Into 94.76 g of a cationic latex polymer at ambient temperature was blended 3.94 g of a 16.5% aqueous solution of Ethoquad 18/25 cationic surfactant and 1.3 g of Marlox N 92 alkoxylated alcohol to yield an invertible latex. The water in the torque monitor apparatus contained 3.5% salts with an equivalent hardness of 6600 ppm of $CaCO_3$ and was maintained at 25° C. Then the invertible latex mixture was injected into the water to yield a dilute latex having 4000 ppm polymer. The torque was observed to increase after an induction period of 45 seconds. A maximum torque of 36 cm-g-force was achieved at 1180 seconds.

Example 11

Into 96.3 g of a cationic latex polymer at ambient temperature was blended 1 g of a 20% aqueous solution of Alpha Step PC-48 anionic surfactant and 2.0 g of Marlox N 92 alkoxylated alcohol to yield an invertible latex. The water in the torque monitor apparatus contained 3.5% salts with an equivalent hardness of 6600 ppm of $CaCO_3$ and was maintained at 25° C. Then the invertible latex was injected into the stirred water to yield a dilute latex having 4000 ppm polymer. The torque was observed to increase after an induction period of 45 seconds. A maximum torque of 36 cm-g-force was achieved at 1130 seconds.

Comparative Example 9

Into 97.8 g of a cationic latex polymer at ambient temperature was blended 2.2 g of Marlox N 92 alkoxylated alcohol to yield a traditional invertible latex. The water in the torque monitor apparatus contained 3.5% salts with an equivalent hardness of 6600 ppm of $CaCO_3$ and was maintained at 25° C. Then the modified latex was injected into the water to yield a dilute latex having 4000 ppm polymer. The torque was observed to increase after an induction period of 45 seconds. A maximum torque of 20 cm-g-force was achieved at 1200 seconds.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. A method of recovering hydrocarbon compounds from a subterranean reservoir, the method comprising:
    a) forming a water-in-oil latex comprising about 15 wt % to 50 wt % of a water soluble polymer having at least about 50 mole % acrylamide content;
    b) adding about 0.1 wt % to 2.0 wt % of a first inversion surfactant having an ionic charge and a hydrophilic/lipophilic balance of about 15 to 35 to the water-in-oil latex to form an intermediate latex;
    c) adding about 0.2 wt % to 4.0 wt % of a second inversion surfactant having a hydrophilic/lipophilic balance of between about 8 and 20 to the intermediate latex to form an invertible latex;
    d) adding a water source to the invertible latex in a single addition to form a dilute latex comprising about 100 ppm to 10,000 ppm of the water soluble polymer;
    e) injecting the dilute latex into the subterranean reservoir; and
    f) recovering the hydrocarbon compounds, wherein the water source is a high temperature water source, high total dissolved solids water source, or both.

2. A method of recovering hydrocarbon compounds from a subterranean reservoir, the method comprising:
    a) forming a water-in-oil latex comprising about 15 wt % to 50 wt % of a water soluble polymer having at least about 50 mole % acrylamide content and comprising a nonionic surfactant having an hydrophilic/lipophilic balance of about 2 to 8;
    b) adding to a water source a first inversion surfactant having an ionic charge and a hydrophilic/lipophilic balance of about 15 to 35 to form a surfactant-containing water;
    c) adding about 0.2 wt % to 4.0 wt % of a second inversion surfactant having a hydrophilic/lipophilic balance of between about 8 and 20 to the water-in-oil latex to form an invertible latex;
d) adding the surfactant-containing water to the invertible latex in a single addition to form a dilute latex comprising about 100 ppm to 10,000 ppm of the water soluble polymer;
e) injecting the dilute latex into the subterranean reservoir; and
f) recovering the hydrocarbon compounds, wherein the water source is a high temperature water source, high total dissolved solids water source, or both.

* * * * *